United States Patent [19]

Kelly

[11] 3,826,978

[45] July 30, 1974

[54] WAVEGUIDE REFRACTOMETER

[75] Inventor: Arnold J. Kelly, Princeton Junction, N.J.

[73] Assignee: Dynalysis of Princeton, Princeton, N.J.

[22] Filed: Apr. 3, 1973

[21] Appl. No.: 347,525

[52] U.S. Cl. .......................................... 324/58.5 A
[51] Int. Cl. .......................................... G01r 27/04
[58] Field of Search ..................... 324/58.5 A, 58 A

[56] References Cited
UNITED STATES PATENTS
| | | | |
|---|---|---|---|
| 2,532,817 | 12/1950 | Lafferty et al. ................ | 324/58.5 A |
| 3,439,266 | 4/1969 | Rogers ............................ | 324/58 A |
| 3,538,434 | 11/1970 | Brown et al. ................... | 324/58.5 A |

*Primary Examiner*—Stanley T. Krawczewicz
*Attorney, Agent, or Firm*—Sughrue, Rothwell, Mion, Zinn & Macpeak

[57] ABSTRACT

A waveguide driven near its cut-off frequency is used to measure the refractivity of a gas flowing through the waveguide. The lateral dimensions of the waveguide are on the order of a wavelength of the driving signal. In one embodiment, an oscillator drives a reference waveguide containing a vacuum or gas of known refractivity while the same oscillator drives an identical parallel waveguide through which flows a gas of unknown refractivity. The normalized propagated power levels at the same point along the lengths of the two waveguides are measured in order to determine the unknown refractivity. In a preferred variation, the driving frequency is linearly swept from above the cut-off frequency of the evacuated waveguide, and the difference in the frequencies at which the propagated power levels at the measuring point reach a predetermined level in each of the waveguides is used as a measure of the unknown refractivity. The difference in times at which these power levels are reached can also be used as a measure of the unknown refractivity. In other embodiments, the same principle of operation of a waveguide near cut-off frequency is utilized in single and multiple waveguide assemblies to measure the unknown refractivity.

15 Claims, 10 Drawing Figures

WAVEGUIDE REFRACTOMETER

BACKGROUND OF THE INVENTION

1. Field of the Invention

This invention relates generally to the field of refractometers and, more particularly, to an improved microwave refractometer utilizing a waveguide operating in the vicinity of its cut-off frequency for the measurement of very small changes in the refractivity of a gas.

2. Description of the Prior Art

Refractometers using electromagnetic radiation as a probe are generally known in the prior art. Such refractometers in effect fold the probing radiations so that a long path length is traversed in a small volume.

Over the entire depth of the earth's atmosphere from the ground to the vacuum of space, the total change of refractivity amounts to about 400 parts per million. Since variations of one part per million are significant and of interest, numerous techniques have been employed to determine this parameter.

If a sufficient path length is available, very small changes in refractivity can be measured by monitoring, for instance, the phase shift difference between two equal paths, one through the atmosphere and the other through a control gas or vacuum. However, when high spatial resolution approaching the order of the test wavelength is required, for instance, to monitor atmospheric structures such as radioactive feuillets, the long path length technique obviously is inadequate because of the extremely long path lengths which are required.

Essentially, the accurate measurement of refractivity involves the operation of an amplification mechanism to provide a reasonable, easily measurable analog signal reflecting the small, i.e., below $10^{-6}$, variations in atmospheric refractivity one seeks to monitor.

In the case of the long path length technique, the use of many wavelengths of gas amplifies the difference in phase between the reference wave and the atmospheric wave to a useful level. In a similar manner, the action of prior art microwave cavity or capacitor-type refractometers can be viewed as arising from the repeated traversal of an electromagnetic wave through the gas of interest inside a high Q cavity or volume thereby effectively yielding a long path length but now in a compact package. However, such prior art devices are expensive and ineffective for the measurement of very small changes in the refractivity of a flowing gas.

SUMMARY OF THE INVENTION

The broad object of this invention is to provide an improved waveguide refractometer which operates in the vicinity of the cut-off frequency of the waveguide.

A further object of the invention is to provide a waveguide refractometer which has an equivalent electromagnetic wave path length very much greater than the free space wavelengths and in a volume whose dimensions are on the order of a wavelength.

Another object of the invention is to operate such an improved waveguide refractometer at a frequency which is within ± 0.1 percent of the idealized cut-off frequency of the waveguide.

Still another object is to provide a refractometer suitable for in-situ measurement of aircraft wake refractivity.

One embodiment of my improved waveguide refractometer employs a reference waveguide and a sample waveguide, wherein a vacuum or reference gas of known refractivity is contained within the reference waveguide, and a gas of unknown or changing refractivity flows through the sample waveguide. Both waveguides are driven from a common source at a frequency in the vicinity of cut-off. When the driving frequency is accurately fixed, the refractivity of the unknown gas can be calculated by measuring the propagated power levels in the two waveguides at the same distance along their lengths from the common source. Alternatively, the driving frequency may be linearly varied in the vicinity of cut-off, in which case the difference in frequencies or times at which the power levels at the common point reaches a predetermined level is a direct measure of the difference in the known and unknown refractivities.

Even though the preferred embodiment of the invention employs reference and sample waveguides driven at microwave frequencies, the use of infrared and optical frequencies is also contemplated. Furthermore, other embodiments of the invention utilize single and multiple waveguide arrangements.

DESCRIPTION OF PREFERRED EMBODIMENTS

Figure 1:
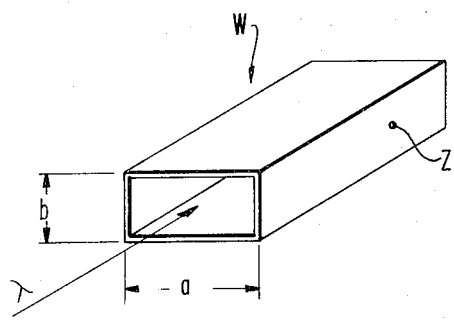
FIG. 1 is a schematic diagram of one form of waveguide which may be used in the invention.

For the purposes of this invention, the terms "near cut-off" frequency and "in the vicinity of cut-off" mean a frequency within ± 0.1 percent of the idealized cut-off frequency of a waveguide. An idealized waveguide is one whose walls have infinite conductivity.

This invention is based upon the fact that the propagated power-versus-frequency characteristic in a rectangular, circular or planar waveguide suddenly becomes very steep in the vicinity of cut-off. For a rectangular or planar waveguide, this abrupt change in propagation behavior occurs when the length of the propagated wave is increased toward and slightly beyond a value equal to twice the major lateral dimension of the waveguide.

Roughly, the trajectory of an electromagnetic wave in a waveguide near cut-off can be visualized as tracing a zig-zag pattern with the wave reflecting from one side of the waveguide to the other as it advances or propagates along the length of the waveguide. As the frequency $f$ of the waveguide approaches (in the idealized situation) the cut-off frequency $f_c$ of the waveguide from a higher frequency, i.e., $f > f_c$, the pitch length or the distance traveled down the waveguide becomes smaller and smaller. In the limit when $f = f_c$, the wave is oscillating laterally with no net energy propagation down the guide, and the wave is now evanescent.

For the purpose of defining pertinent parameters in the description of the invention, the power $P$ associated with the electromagnetic wave propagating through a waveguide at an arbitrary point $z$ at a point along the length of the waveguide is related to the power $P_s$ at the source ($z = 0$) by the following equation:

$$P = P_s \exp(-\alpha z), \tag{1}$$

where the attenuation constant $\alpha$ is a measure of the power lost per unit length from the propagating wave due to dissipation in the walls of the waveguide. For the idealized case of infinite waveguide wall conductivity, the skin depth $\delta$ and therefore $\alpha$ is zero. However, assuming that the dielectric losses associated with the material filling the waveguide are negligible and can be neglected (a totally reasonable assumption for the gases of interest with respect to the improved waveguide refractometer of this invention), the attenuation constant $\alpha$ is determined by the properties of the waveguide material and the characteristics of the propagating wave itself. Since the skin depth is typically quite small for usual waveguide materials and operating frequencies of concern (e.g., the skin depth for aluminum at a frequency of 9.5 GHz is on the order of one micron as compared to characteristic waveguide dimensions on the order of 1 cm), it will also be assumed that the dissipation process does not significantly alter the ideal (where the waveguide walls have infinite conductivity) field pattern of the propagating wave. This assumption breaks down very close to cut-off where $f/f_c \approx 1$. However, for the purposes of this description it will be employed. Justification for the application of this assumption can be found in published prior art where it has been shown that the attenuation constant $\alpha$ is a function of the propagating wavelength $\lambda$ in the region on either side of the idealized cut-off frequency $f_c$. As will be shown below, only the difference between the behavior of two signals as a function of frequency is significant to this invention and can be used to provide a useful measure of refractivity provided the signals are functions of wavelength.

By using the above assumption, a simplified approach can be presented to describe the operation of a waveguide operating in the vicinity of cut-off. For the case of dominant mode ($TE_{10}$) propagation in a rectangular waveguide W (FIG. 1) having a major lateral dimension of $a$ cm and a minor lateral dimension of $b$ cm and driven by an electromagnetic wave having a wavelength in a vacuum of $\lambda_o$ cm:

$$2a/\lambda = f/f_{co} \tag{2}$$

where $f_{co}$ is the frequency corresponding to a free-space wavelength of $2a$ cm, i.e., the point at which the electromagnetic wave in the ideal case would become evanescent. By letting $a = 2b$, which relationship is consistent with the dimension ratio of many commercially available waveguides, it can be shown that for frequencies close to $f_{co}$ such that $$f/f_{co} = f_{co} + \Delta f/f_{co} = 1 + F, \tag{3}$$

and restricting the discussion to situations such that $$F = \Delta f/f_{co} \ll 1, \tag{4}$$

then, the attenuation constant $\alpha_o$ for an evacuated waveguide may be expressed as $$\alpha_o \approx C/a^{3/2} \{\sqrt{2/F}\}, \text{ cm}^{-1} \tag{5}$$

where $C$ is a constant specific for the particular waveguide material, e.g., $C = 3.38 \times 10^{-4}$ for silver and $4.46 \times 10^{-4}$ for aluminum.

We now consider the situation wherein a gas of refractivity $N$ (where $N_o = 0$ for a vacuum) fills the waveguide; then, since $$f = c/\lambda_o = v/\lambda \tag{6}$$

where $v$ is the velocity of wave propagation in the gas and $c$ is the speed of light or wave propagation velocity in a vacuum, and where $$v = c/1 + N \cdot 10^{-6} \tag{7}$$

where $N$ is the refractivity of the gas, so that
$$\lambda = \lambda_o/1 + N \cdot 10^{-6} = \lambda_o/1 + N', \text{ i.e. } N' = N \cdot 10^{-6} \tag{8}$$

one may write with the approximation that $N' \leq 4 \times 10^{-4} \ll 1$, $$\alpha_{N'} \approx C/a^{3/2} \{\sqrt{2/F + N'}\} \text{ cm}^{-1} \tag{9}$$

Because the free space propagation velocity $v$ in the gas is smaller than $c$, then, for a given frequency $f$, the wavelength is shorter in the gas than in the vacuum. This is reflected as a lower attenuation constant as compared to propagation in a vacuum. Indeed, for the assumed ideal case (no distortion of the waveguide field patterns), the vacuum filled waveguide will be completely cut-off at $F = 0$ (i.e. $\alpha$ would go to infinity) whereas the gas filled waveguide would still be propagating some energy.

If we consider 10 cm to be a reasonable waveguide length between the power source $P_s$ and a detector placed at the point $z$ to measure the power being propagated, and a rectangular waveguide having a major lateral dimension $a$ of 2 cm, we can see that $$P/P_s = \exp(-\alpha_{N'} z) \approx \exp(-10^{-3}/F + N') \tag{10}$$

Since it is desirable to measure with an accuracy of one $N$ unit corresponding to $N' = 10^{-6}$, if $F$ is between 0 and $10^{-6}$ significant variation in amplitude of the above function will occur.

The above example is presented to illustrate the basic amplification potential of a waveguide operating in the vicinity of cut-off. The fact that significant power reductions occur at convenient waveguide positions when $F$ is between 0 and $N'$ is important to the principle of this invention wherein a waveguide operating near cut-off is used to measure refractivity. As equation (10) shows, when the normalized power $P/P_s$ is measured, $N'$ can be calculated when the source frequency $f$ is fixed and known. This result follows since $\Delta f$ and the cut-off frequency $f_{co}$ (and $F$) are also known. In this case, a very constant frequency source and a waveguide material having low thermal expansivity are required.

In the preferred embodiment of the invention, the reference and sampling waveguides are positioned such that they are strongly thermally coupled so that both experience the same thermal environment.

Within wide limits, providing $F$ is not several orders of magnitude larger than $N'$, the effects of temperature on the near cut-off operation of the waveguide will be of a second or higher order. Temperature effects are restricted to the determination of the cut-off frequency $f_{co}$ and are handled as a minor calibration adjustment, as discussed below.

Figure 2:
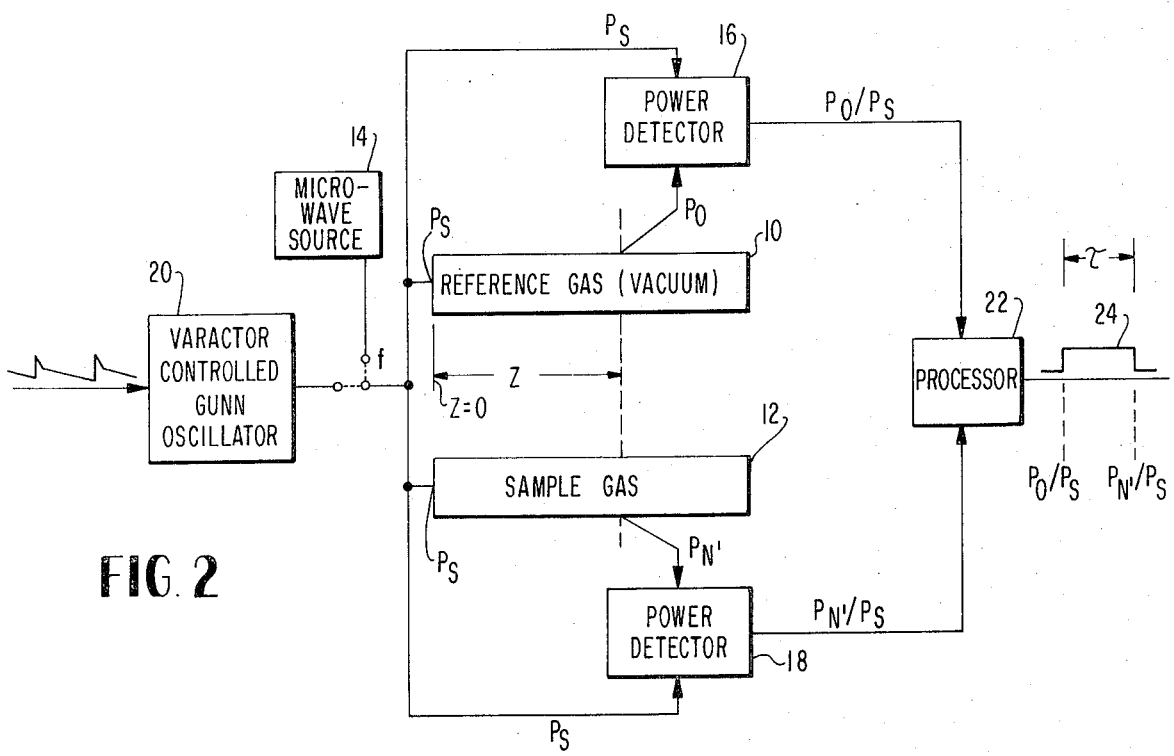
FIG. 2 is a block diagram of a preferred embodiment of the invention employing a reference waveguide and a sample waveguide.

Let us now turn to FIG. 2 which diagrammatically illustrates a preferred embodiment of the invention employing two identical waveguides 10 and 12 driven by a microwave source 14 at a frequency $f$ within a frequency range in the vicinity of cut-off. For convenience, waveguide 10 will be termed the reference waveguide and will be assumed to be under vacuum, while the other waveguide 12 will be termed the sampling waveguide and is filled with a gas having a refractivity of $N$ units, where the refractivity $N_o$ of a vacuum is 0. The special case of an evacuated waveguide provides a reference point against which the behavior of the sampling waveguide 12 can be compared.

If we specify that the two waveguides 10 and 12 are coupled at position $z = 0$ to the microwave source 14 of power level $P_s$ and that the detection of the propagated power level $P$ in the waveguide occurs at a distance $z$ cm along the length of both waveguides by respective power detectors 16 and 18, such as microwave detector crystals, then the two detected power levels for the ideal case can be expressed as follows:

$$P_o/P_s = \exp(-\alpha_o z) = \exp\{-Cz\sqrt{2}/a^{3/2} F^{1/2}\} \quad (11)$$

$$P_{N'}/P_s = \exp(-\alpha_{N'} z) = \exp\{(-Cz\sqrt{2})/(a^{3/2}(F+N')^{1/2})\} \quad (12)$$

where $P_o/P_s$ and $P_{N'}/P_s$ are the relative output signals of the reference and sampling waveguides 10 and 12, respectively, assuming the detectors are of the square law type. (The use of identical waveguides is a convenience and not essential to the overall functioning of the waveguide refractometer).

Comparison of equations (11) and (12) reveals that, providing $C$, $z$ and $a$ are the same, the two signals $P_o/P_s$ and $P_{N'}/P_s$ will simply be spaced in the $F$ domain a constant amount $N'$ apart. This observation forms the basis for this invention wherein a waveguide operating in the vicinity of cut-off is used as a refractometer. In addition, the fact that the signals $P_o/P_s$ and $P_{N'}/P_s$ are strongly varying functions of $F$ in the vicinity of $F = 0$ provides a convenient means for the determination of the separation distance $(F_o - F_{N'} = \Delta F = N')$ of the two signals.

These output signals can be equally well expressed in terms of the free space wavelength of the medium filling the waveguide since the refractivity $N'$ appears as an additive factor in association with $F$. Consequently, since the exact solution for the behavior of actual lossy waveguides at cut-off can be expressed as a function of wavelength, the true behavior of signals $P_o/P_s$ and $P_{N'}/P_s$, as opposed to the idealized expressions set forth immediately above, will show the same displacement effect. As with the idealized case, the signals are strongly dependent upon $F$ in the vicinity of cut-off, but are generally displaced to lower frequencies, i.e., higher values of $-F$. Therefore, the idealized description can be meaningfully employed to describe the operational characteristics of the waveguide refractometer.

Figure 3:
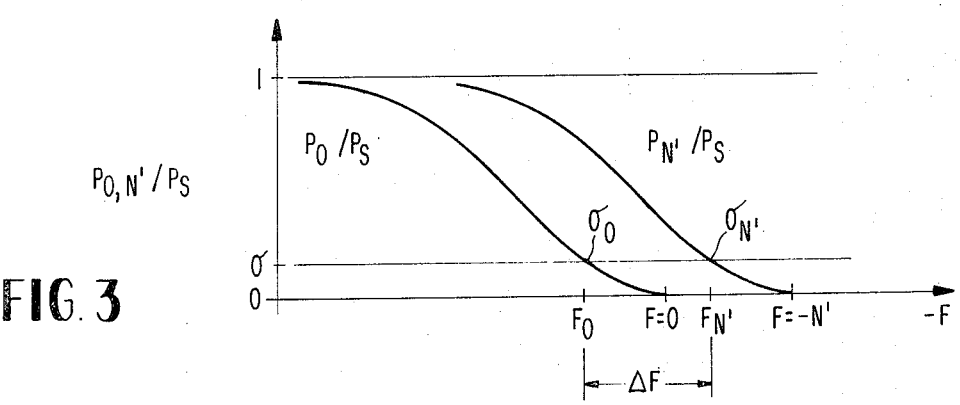
FIGS. 3, 4a, 4b, 5a and 5b are graphs illustrating the operation of the invention.

If the frequency $F$ of the microwave source 14 is varied about the cut-off frequency $f_{co}$, i.e. $F = 0$, the idealized signals $P_o/P_s$ and $P_o/P_s$ and $P_{N'}/P_s$ represented by the above equations will behave in the manner depicted in FIG. 3.

FIG. 3 is purposely drawn to show the frequency $f$, or more accurately, the normalized frequency difference $\Delta f/f_{co} = F$, decreasing along the abscissa. Having the source frequency sweep from above the cut-off frequency to a value below the cut-off frequency offers an operation advantage which will be discussed below. However, at this point in discussion, no preferred sweep direction is apparent.

Defining $\sigma_o$ as the level at which detection of the $P_o/P_s$ signal occurs at $F_o$, and defining $\sigma_{N'}$ as the level at which the signal $P_{N'}/P_s$ is sensed at the frequency $F_{N'}$, and further defining $\Delta F = F - F_{N'}$, then it can be shown that, when the two waveguides are identical in all respects and the detection levels $\sigma_o$ and $\sigma_{N'}$ are maintained equal, $\Delta F = N'$ independent of $F$, remembering that $N' = N \cdot 10^{-6}$, where $N$ is the refractivity of the gas in the sampling waveguide 12. Furthermore, it is quite clear that the exact behavior of this signal as a function of $F$ is quite unimportant, providing the signal is single-valued. From a purely practical standpoint, the fact that the normalized power signals $P_o/P_s$ and $P_{N'}/P_s$ vary radically from approximately 1 to approximately 0 in the vicinity of cut-off is a bonus insofar as it will permit straightforward circuitry to be used to process the signal, as will be described below in connection with FIG. 2.

Certain physical variations in the waveguides may affect the sensitivity of the refractivity measurement. For example, variations in fabrication of the waveguides can cause differences in the waveguide dimension $a$ or in the material constant $C$ which can be up to 100 percent greater than the theoretical or idealized case assumed. Furthermore, variations occur in construction, such as differences in the relative positioning $z$ of the power detectors 16 and 18 with respect to the microwave source. These variations can be compensated directly by adjusting the detection levels such that $$A_{N'}/A_o = \ln \sigma_{N'}/\ln \sigma_o, \quad (13)$$

where $A_o$ and $A_{N'}$ define the characteristic dimensions and parameters of the evacuated and sampling waveguides 10 and 12, respectively, and where $$A_o = (C z \sqrt{2}/a^{3/2})_o \quad (14)$$

and $$A_{N'} = (C z \sqrt{2}/a^{3/2})_{N'} \quad (15)$$

When the detection levels $\sigma_{N'}$ and $\sigma_o$ are so adjusted to achieve the matched condition, then $\Delta F$ is rigorously equal to $N'$. It should be noted that the signal levels are normalized to the power received when $F$ is large and positive, i.e., to the condition $\sigma = 1$ and $P_o = P_{N'} = P_s$. This assumption is realistic, closely approximately in practice, and provides a high level of insensitivity to variation in the source power level. If the matched condition is only approximately satisfied, noise caused by the mismatch in the signal detectors 16 and 18 can be minimized by setting the detection level at twice the noise level. As previously discussed, the influence of temperature on the measurement of $N'$ will be of the order $N' \cdot 10^{-4}$ and can be neglected.

In the prior discussion, it was assumed that one of the waveguides was evacuated to provide an invariant reference state. In general, it is only necessary to have knowledge of the refractivity of the material filling the reference waveguide 10 in order for an absolute determination of the refractivity of the medium contained in the sampling waveguide 12 to be made. For example, when the reference waveguide 10 is not evacuated, it may contain a foamed plastic filling having a fixed known refractivity level or a low refractivity gas (helium) filling which has low sensitivity to external conditions, such as pressure and temperature.

If only the difference in refractivity between two gases is of interest, rather than the absolute measurement of the refractivity of one of the gases, the measurement of the difference in refractivity can be made directly by flowing each gas though a different one of the waveguides. In this case, $\Delta F$ is then equal to the difference in refractivities of the two gases.

In a preferred embodiment of the invention, where the driving frequency $f$ is linearly varied, the microwave source must be capable of changing frequency in a temporally reproducible manner in order to take advantage of the linearity between frequency shift and $N'$. In this case, a time shift measurement may be employed to measure refractivity rather than a frequency shift measurement which is difficult to accomplish inexpensively in practice.

The most straightforward approach to measuring $N'$ is to modulate the source frequency $f$ (or more precisely $F$) in a repititious manner linear in time, i.e., by employing sawtooth or triangular wave modulation. This can be conveniently accomplished by using, in place of the fixed frequency source 14, a voltage-tunable solid state microwave source 20, such as a varactor-controlled Gunn oscillator and by applying a suitable modulating signal to its tuning terminals. Solid state sources exhibit excellent linearity between the impressed tuning voltage and the output frequency, particularly for the narrow tuning ranges associated with the operation of the dual waveguide refractometer in the vicinity of cut-off. Consequently, in the following discussion, the characteristics of the frequency modulation waveform will be taken to be synonymous with those of the tuning voltage wave form.

Four criteria have to be satisfield by the frequency modulation waveform, viz:

1. Linearity of frequency with time. 2. Controlled repetition rate, designated by $\phi$(Hz) (i.e., repetition time = $1/\phi$ sec$^{-1}$), adequate to satisfy the designed sampling rate of the device (i.e., $\phi \sim 1$ KHz).
3. Sufficient depth of frequency modulation, defined as $\psi$(Hz), such that variations in $f_{co}$ and source frequency due to temperature variations of the waveguide and source, respectively, do not cause the cut-off condition to fall outside of $\psi$ for either waveguide.
4. The sweep rate, i.e., time rate of change of source frequency, which for "saw tooth" modulation is $\psi/\phi$, is slow enough to permit high accuracy in the determination of $N' = \Delta F = > \tau$, where $\tau$ is the amount the two signals are shifted in the time domain, yet fast enough to permit determination of the largest $N$ value (largest $\tau$) within the repetition time $1/\phi$.

Figure 4A:
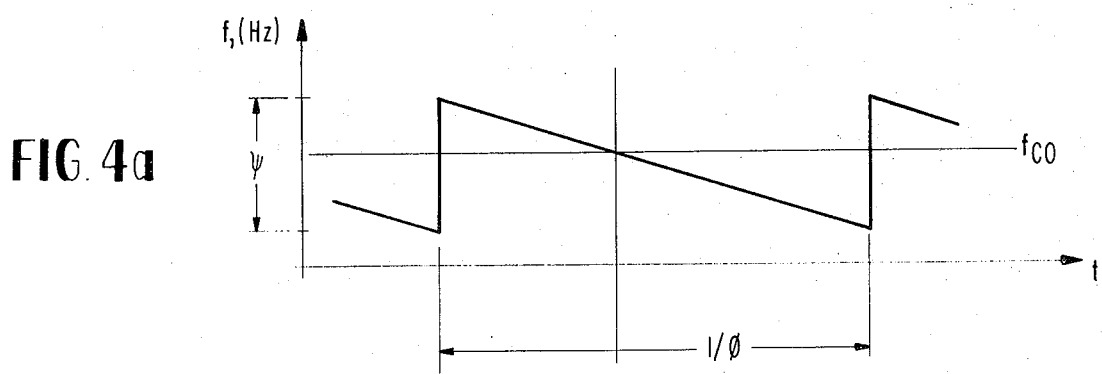
Figure 4B:
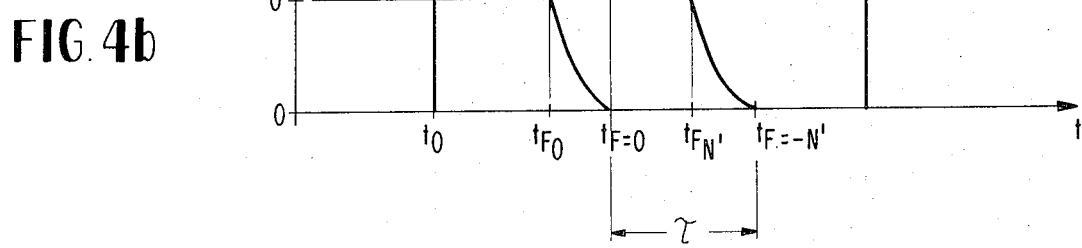

FIG. 4 graphically displays the manner in which the various parameters discussed are related for the case of an idealized dual waveguide device whose driving source is frequency modulated by a sawtooth tuning voltage, and assuming the matched condition, i.e. $A_o = A_{N'}$ and $\sigma_o = \sigma_{N'}$.

Note that for the assumptions employed, the system is matched and consequently time differential $\tau$ is independent of $t$ since $\Delta F$ is independent of $F$. Therefore the value of $\tau$ at signal level $\sigma$ is equal to $\tau$ at $\sigma = 0$, i.e., $\tau = t_F = -N' - t_{F=0} = t_{F'} - t_{F_o}$.

Because of the existence of manufacturing variations, the waveguide internal major dimension $a$ may not be equal to the theoretical value assumed. To compensate for this variation, a certain amount of initial tuning will have to be accomplished to insure that $F$ falls within the frequency range defined by $\psi$ for the entire range of $N'$ values of interest. This is best accomplished by either electrically biasing the tuning range or mechanically tuning the source to the proper frequency. In any event, such static dimensional variations are easily handled, assuming an adequate tunability range of the source.

As an example of the magnitude of mechanical (or electrical) tuning required to compensate for waveguide dimensional variation, we consider the commercially available RG 349 waveguide used in the X-band refractometer as previously discussed. This waveguide has a nominal internal major dimension $a = 1.58$ cm and an ideal cut-off frequency $f_{co} \approx 9.5$ GHz. Typical waveguide manufacturing tolerances of $\pm 25$ $\mu$(i.e., $\pm 0.001$ inches) would imply that the ideal cut-off frequency would be expected to vary from waveguide to waveguide by $\sim \pm 15$ MHz. This range of tuning is well within the capability of all variable frequency sources presently available and therefore need not be considered further. While it has been demonstrated that temperature variation will not affect the measurement of $N'$ (i.e., $\Delta F$ and $\tau$ are to second or higher order independent of temperature when the reference and sampling waveguides are strongly thermally coupled), the cut-off frequency and therefore the range over which $\tau$ is measured will be altered. This alteration, due to the expansion and contraction of the waveguide, in particular the major width $a$, has to be allowed for in the determination of the modulation depth $\psi$.

The ideal cut-off frequency is related to the major inside dimension $a$ directly as $$f_{co} = c/2a .$$

(16)

Defining the dimensionless thermal expansivity parameter $\theta$ as the product of the thermal expansivity coefficient of the waveguide material and the difference between the refractometer temperature and some reference temperature (e.g., 20°C.), then clearly $$\Delta F_{co} \approx - \theta \qquad (17)$$

where $\Delta F_{co}$ is the change in normalized cut-off frequency defined as $$\Delta F_{co} = f_{co}(T) - f_{co}(T_{ref})/f_{co}(T_{ref}). \qquad (18)$$

If an aluminum waveguide is used for the refractometer and a temperature range of ±40°C. around a reference point of 20°C. is required to cover all operational conditions of potential interest, then $\Delta F_{co} \approx \pm 2 \times 10^{-3}$. Assuming $f_{co} \approx 9.5$ GHz, then the modulation depth $\psi \approx 40$ MHz.

It is worthwhile noting that, at most $N' \approx 4 \times 10^{-4}$ so that $F = N' \approx 4 \times 10^{-4}$. Consequently ~80 percent of the modulation depth is required to allow for temperature variation. For a given sampling rate (repetition rate $\phi$), the larger $\psi$ the smaller the time differential $\tau$ will be for a given $N'$. Therefore, it is desirable to have as slow a sweep rate as possible, thereby immediately setting a limit on the repetition rate possible.

Since most sources of interest exhibit a frequency temperature sensitivity of 0(0.3 MHz/°C.) and since the source can be thermally insolated from the refractometer proper and maintained in a thermally stable environment by means of proper insulation and thermostatically controlled heaters, this additional contribution to $\psi$ will be neglected.

The repetition rate $\phi$ is determined by the temporal and spatial resolution requirements established for the refractometer on the basis of operational needs. If it is established that the spatial resolution of the refractometer is to be $L$ cm when operating aboard a vehicle having velocity $V$ cm/sec, we can obviously write:

$$\phi = V/L \text{ Hz}$$

The minimum repetition rate $\phi_{min}$ occurs when the sampling waveguide is perfectly ventilated so that $L = z$, the distance between the source and the detector positions measured along the axis of the waveguide. Realistically $L > z$ due to fluid mechanical effects arising from boundary layer buildup and nonzero angle of attack of the refractometer with respect to the relative airstream. For discussion purposes we write:

$$\phi_{min} = V/z$$

The maximum repetition rate $\phi_{max}$ is established by considering the minimum signal time differential $\tau_{min}$ acceptable for proper signal processing consistent with a desired refractivity resolution of the device defined as $\delta N'$, that is, $$\delta N' = (\Delta F)_{min}$$

For a linear sweep rate, it can be shown that $$\phi_{max} = (\delta N') f_c/\tau \text{ min} \qquad (19)$$

Clearly, for the refractometer to be a viable device $\phi_{max} \quad \phi_{min}$ i.e., $\delta N' f_c/\psi \tau \text{min} \geq V/z$ must prevail.

In order to insure that the above condition (19) is always satisfied, it would be desirable to reduce $\psi$ to as low value as is consistent with the complete scanning of the refractivity range of interest. As noted earlier, the majority of the modulation depth $\psi$ results from thermal expansion effects. We may write $\psi$ as $$\psi = |\psi_T| + |\psi_{N'}|$$

where $\psi_T$ is the modulation depth required to compensate for temperature effects and $\psi_{N'}$ is the modulation depth required to cover the refractivity range, i.e., $$|\psi_T| \approx (\Delta F_c) (f_c) \approx |-f_c \theta'|$$

and $|\psi N'| = \Delta F f_c = N' f_c$ for the matched condition where in general $\psi_T >> \psi_{N'}$.

Figure 5A:
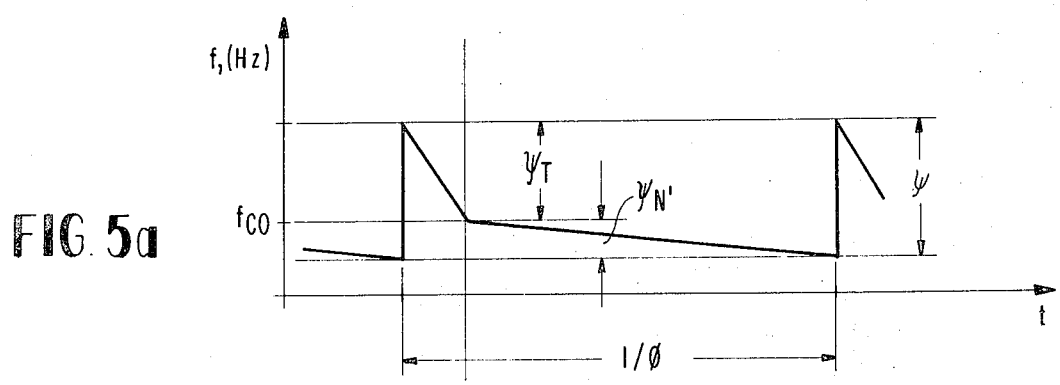
Figure 5B:
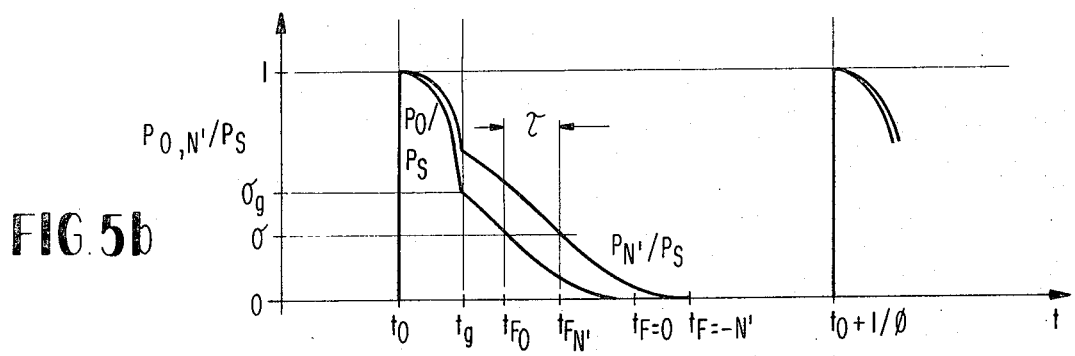

The most straightforward approach is to employ a modified sawtooth frequency modulation of the type depicted in FIG. 5.

Considering one cycle of a modified sawtooth, starting at $t_o$, the source executes a very rapid decrease in frequency (from the maximum frequency point) at a rate of $\psi_T/(t_g - t_o)$. This sweep rate is maintained until time $t_g$ whereupon the reference waveguide signal $P_o/P_s$ reaches a predetermined gate level $\sigma_g$. For fixed $\sigma_g$ the time at which the frequency sweep is slowed to $\psi_N/(1/\phi - t_g)$, $(tg)$ is variable and a linear function of the refractory temperature. Indeed the time internal $t_g - t_o$ could be used as a measure of refractometer temperature, if so desired.

The initial rapid sweep rate can be made almost arbitrarily large (existing solid state sources are capable of being swept in the GHz range) so that, in general it is possible to make $t_g << 1/\phi$. In the limit then of $t_g - t_o \rightarrow 0$, for the modified sawtooth (MS), the condition for a "viable" refractometer can be expressed as $$\phi_{max} \text{ MS} \approx \delta N f_c/\psi N' \tau_{min} = \delta N'/N'_{max} 1/\tau \text{min} \qquad (20)$$

providing $\sigma \leq \sigma_g$ and $\sigma \approx \sigma_g$.

A comparison of expressions (10) and (20) shows that, for fixed $N'$, the minimum time lag $\tau_{min}$ has been increased by a factor of $\psi/\psi_{N'}$ i.e., by about 5, or alternatively, for fixed $\tau_{min}$, the refractivity resolution $\delta N'$ is improved by the same amount by using a modified rather than a standard sawtooth frequency modulation waveform.

As an example, if we specify $\delta N' = 10^{-7}$ (i.e., 1/1 $N$ unit), $N'_{max} = 4 \times 10^{-4}$ (atmospheric gas measurements, evacuated reference waveguide) and $\tau_{min} = 10^{-6}$ sec, then $\phi_{max} \approx 250$ Hz. $\phi_{max}$ can be increased by operating at a lower resolution, i.e., $\delta N' > 10^{-7}$ or at the same resolution by employing a reference material whose refractivity is closer to, but still less than, the range of the sample gas. Alternatively, a decrease in $\tau_{min}$ would also permit a higher sampling rate.

It should be noted that the assumption $\sigma_g > \sigma$ has been invoked, where $\sigma$ is the level at which $\tau$ is determined. This inequality results from the manner in which the frequency is swept. It is now obvious why a decreasing frequency sweep is preferred. This feature permits a modified sawtooth modulation to be implemented and results directly in substantial increase in sensitivity.

The level $\sigma$ at which the signal is to be measured should, as noted, be close to but below $\sigma_g$. In order to minimize the time between the attainment of the gate signal level $\sigma_g$ and the measurement level $\sigma$(i.e., minimize $t_{F_o} - t_g$ and consequently maximize $\phi$), transients involved in changing the sweep rate should be kept to an absolute minimum by careful design of the frequency modulation circuitry.

It was previously shown, that for small levels of mismatch (ideal case), it would be desirable to have the signal detection level as small as possible to minimize errors. A level approximately twice the noise level was stated as yielding the minimum error. From a signal processing standpoint a different criterion can be applied. The accuracy of detection of the signal level $\sigma$ is enhanced the faster the signal level changes with frequency or time. For a fixed sweep rate, the maximum rate of change of signal level with frequency (or time) occurs at the inflection point of the signal curve (i.e., $\delta 2 (P/P_s)/\delta F^2 = 0$). It is at this point then that detection should preferably occur.

From the previous equations, it can be shown, for the ideal case, that the steepest portion of the $P_o/P_s$ and $P_{N'}/P_s$ signal curves correspond to $\sigma = \exp(-3) \approx 0.05$. For the matched condition then, $\sigma = 0.05$ and $\sigma_g = 0.05$ +, such that $t_{F_o} - t_g >$ sweep switching transients. For realistic noise levels $\sigma \sim 0.05$ would be a reasonable choice.

When operating at the matched condition, the refractivity $N'$ is precisely equal to $\Delta F$, assuming an evacuated reference waveguide. (If the reference waveguide were filled with a medium of refractivity $N_o'$, then $\Delta F = N_o' - N'$.) When the frequency is swept in the manner of FIG. 5, then $N' = \Delta F = (\psi N'/1/\phi - t_g) \tau/f_{co}$ In other words $N'$ is linearly proportional to $\tau = t_{F_{N'}} - t_F$ (assuming the matched condition and $t_{F_o} \approx t_g$, $t_{F_o} - t_g << 1/\phi$). Of the numerous techniques that could be applied to take advantage of this feature of the device, the simplest would appear to be to use a processor 22 in the form of a flip-flop circuit to generate a rectangular pulse of arbitrary amplitude having duration $\tau$. To accomplish this, the $P_o/P_s$ signal initiates the pulse when $P_o/P_s = \sigma$ (i.e. at time $t_{F_o}$) and the $P_{N'}/P_s$ signal terminates the pulse at $t_{F_{N'}}$ (when $P_{N'}/P_s = \sigma$).

This form of output, i.e., fixed amplitude, variable duration pulses, is quite amenable to integration with telemetry systems currently in use.

The power of signal detectors 16 and 18 may be 1N23 crystal detectors. These detectors have an output of $\sim 300 \mu v/\mu$ watt so that a reasonable signal output level (0 $10^s$ of mv) can be obtained from quite modest source power levels (e.g., milliwatt range sources).

The frequency modulated source 20 may be a Microwave Associates Model MA–87101 varactor-controlled Gunn oscillator. Such a generator has an output of approximately 10 mw, a mechanical tuning range of ±150 MHz and an electronic tuning range of 60 MHz, making it quite compatible with the requirements of the waveguide refractometer.

In a practical waveguide, for a spatial resolution of ≤ 10 cm, a sampling rate $\phi$ of 2KHz, and a sensitivity ≤ 1 N unit, the refractometer would be designed such that $z = 10$ cm, $\phi = 2$ KHz, and $\delta N' = 5 \times 10^{-7}$ (½N unit).

Assuming that a refractivity range of 400 N units and an evacuated reference waveguide are employed, then $N' = 4 \times 10^{-4}$ and the minimum duration $\tau_{min}$ of the output pulse 24 would be 5/8 $\mu$ sec, corresponding to ½ N unit. The longest pulse $\tau_{max}$ corresponding to $N = 400$ units would be 0.5 msec, i.e., $1/\phi$. This calculation is based on the assumption that the initial sweep period of modulation depth $\psi_T$ and duration $t_g - t_o$ and the switching transient period $t_{F_o} - t_g$ are both between 0 and 1 $\mu$sec. However, if the initial sweep period and the switching transient are both taken to be equal to 50 $\mu$sec, then $\tau_{min} = 0.50 \mu$sec and the maximum pulse duration for $N = 400$ is $\tau_{max} = 0.4$ msec.

For an RG 349 aluminum waveguide with a nominal internal major dimension $a = 1.58$ cm and a corresponding ideal (vacuum) cut-off frequency in the X-band, viz 9.488 GHz, the rapid sweep rate is approximately 400 GHz/sec. The slow sweep rate by contrast is, for the matched case, approximately 7.8 GHz/sec. Both of these sweep rates are well within the modulation capability of existing devices.

The field components of an electromagnetic wave propagating in a waveguide obeys an expression of the form: $\exp(i2\pi ft - \nu z)$, where $f =$ frequency, $t =$ time, $z =$ position, positive in the direction of propagation along the waveguide; and $\nu = (\alpha/2) + i \beta$.

The imaginary component of $\nu$ is the propagation constant $\beta$ while the real part is the attenuation constant $\alpha/2$. Equation (1) can be written in the form: $P/P_s = \exp(-\alpha z)$.

Earlier we wrote the expression for the free-space wavelength $\lambda$ and an electromagnetic wave in the medium of refractivity $N$ in terms of the wavelength $\lambda_o$ and vacuum as $\lambda = \lambda_o/1 + N'$.

Since for all situations of interest, $F << 1 \therefore F^2 << F$ and for all atmospheric conditions of concern $N' << 1$, we can then write:

$\nu \approx 2 \pi/a \{-(F + N') + 4Z(1 + (F + N')/\pi a)^{1/2} \angle 3\pi/4\}^{1/2}$ (21)

where $Z = \delta \sqrt{\pi/\lambda_o}$ and $\delta$ is the skin depth.

Again, the important factor to note in express (21) is the manner in which refractivity and frequency are related. The refractivity appears as an additive term with respect to the frequency term. In other words, a shift in refractivity, for instance N' increasing, is the same as an equivalent shift of frequency to a lower value.

Figure 6:
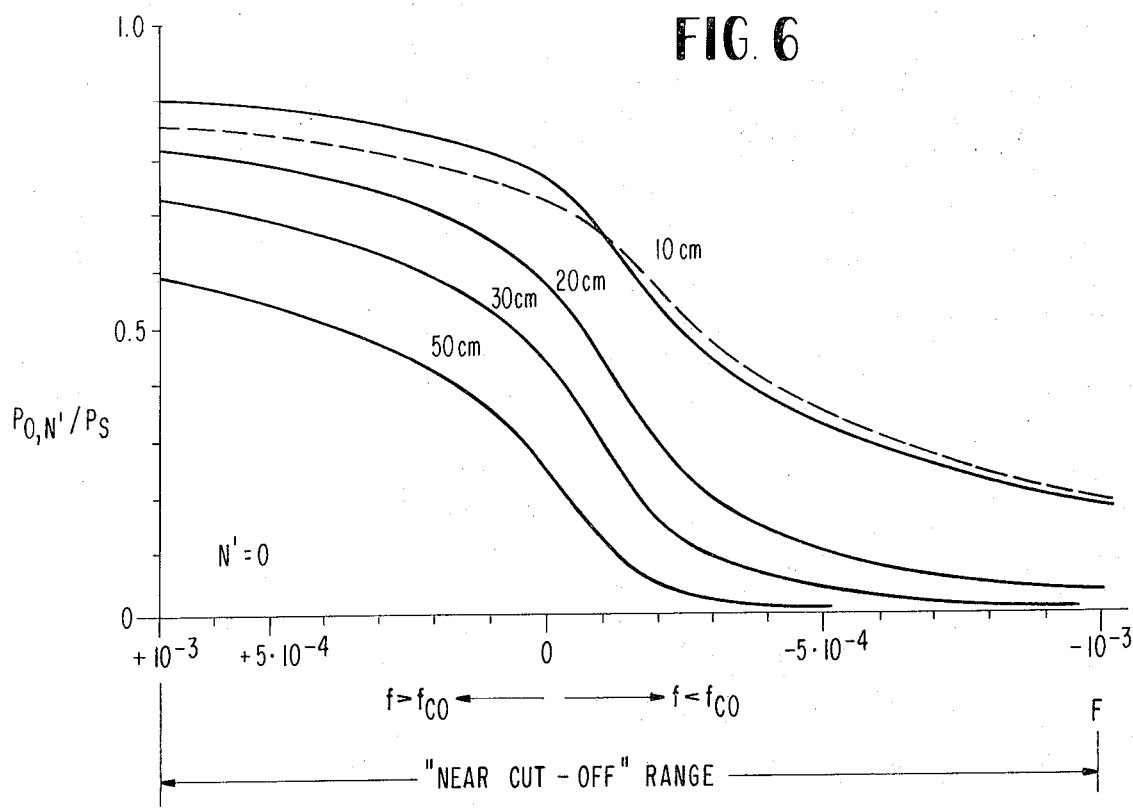
FIG. 6 is a graph illustrating the actual operation of a waveguide refractometer.

FIG. 6 illustrates a set of curves developed from a numerical evaluation of the real part of equation (21) for an RG 349 aluminum waveguide having a cut-off frequency $f_{co} = 9.488$ GHz and for $N' = 0$. The solid lines are for a waveguide conductivity $g = 3.51 \cdot 10^7$ (ohm-m)$^{-1}$, and the dotted curves represent a $g = 1.76 \cdot 10^7$ (ohm-m)$^{-1}$. The significances of the dotted curve representing one-half conductivity of the solid curve for a 10 cm waveguide is that halving the conductivity, i.e., doubling of the skin depth, can easily occur as the usually highly polished inside surface of the waveguide becomes corroded or badly scratched.

As will be noted, the higher conductivity curve is steeper than its low conductivity companion. Consequently, from an operational standpoint it would be desirable to use as high a conductivity wall material or coating as possible so as to maximize the slope of the curve, thereby facilitating detection of refractivity-induced shifts of position in the frequency domain.

It should also be noted that a maximum slope exists for a waveguide length between 10 and 20 cm which is in the range appropriate for refractometer use. The maximum slope is fixed by the conductivity of the wall material much as the Q of cavities are fixed by the same factor. In fact the curves of FIG. 6 can be viewed as integrated resonance curves because of the basic similarity of the underlying phenomena occurring in cut-off waveguides and resonant cavities.

FIG. 6 serves to quantify the term "near cut-off." Frequencies in the range $(1 - 10^{-3})f_{co} \leq f \leq (1 + 10^{-3})f_{co}$ can be defined as being in the "vicinity" of cut-off. Temperature changes will alter the dimensions of the waveguide, and consequently the cut-off frequency will shift in proportion to the extent the major internal dimensin $a$ lengthens or contracts. Also since increasing changes in the refractivity of the medium filling the waveguide will shift the curve to the right, i.e., to lower frequencies in a manner proportional to $N'$, a more encompassing definition of near cut-off would be: that frequency range within ±2 percent of the idealized cut-off frequency i.e., $(0.98) f_{co} \leq f \leq (1.02)f_{co}$.

For a given waveguide length because $N'$ always appears in equation (21) as an additive component to F, the response curve shifts uniformly without distortion, to the right (i.e., to lower frequencies).

In another embodiment of the invention, a refractometer is achieved by using a single waveguide rather than the two waveguides discussed above. The dual waveguide embodiment permits inexpensive construction material such as aluminum to be employed while providing a high degree of temperature insensitivity.

Two variations of a single waveguide refractometer will be discussed below. In both cases, it is assumed that the source frequency is selected to occur in an atmospheric "window," i.e., no significant absorption by atomic or molecular resonances is presumed to occur.

The simplest form of a single waveguide refractometer consists of a source having a well defined fixed frequency, a waveguide constructed of low (or zero) thermal expansivity material and a suitable detector. In order to account for variation in source output power, a second detector sensing the source power output is used. The output of this second detector is employed to normalize the output of the detector monitoring the power propagated through the waveguide by means of suitable circuitry.

Clearly, this scheme is easy to implement at virtually any frequency desired, up to and including those in the optical region of the spectrum. The major difficulty with any such instrument designed to operate at optical frequencies would be fluid mechanical problems associated with flow through micron and submicron sized waveguides. Consequently, while the basic concept is applicable to this wavelength range, it would be more reasonable to consider operations in the infrared or millimeter wavelength regime.

To facilitate signal detection, several closely packed parallel waveguides could now be used rather than just one isolated waveguide. This design would also facilitate the fluid mechanical design of the device. Indeed in the millimeter wavelength range a section of "honeycomb" offers in convenient form, such a multiplicity of parallel waveguides, provided the thermal expansivity of the honeycomb material is acceptable and the propagation mode in hexagonal cross-section waveguides is acceptable.

Unlike the dual waveguide refractometer, the normalized output signal from the single waveguide fixed frequency refractometer will not be a linear function of refractivity. This can be seen by reference to FIG. 6 which is representative of the type of behavior to be expected from all surface materials of interest and all frequencies (well removed from atomic and molecular resonant effects).

For discussion purposes if we assume operation at $K$ band with a frequency $F = -3 \times 10^{-4}$ and a waveguide length of 20 cm, the normalized signal $P/P_s = 0.205$ for $N' = 0$ (vacuum). Recalling that as refractivity increases the curves shift to lower frequencies by an amount $F = N'$, then $N' = 10^{-4}$ (i.e. $N = 100$) corresponds to $P/P_s = 0.305$; $N' = 2 \times 10^{-4}$ ($N = 200$) corresponds to $P/P_s = 0.45$; $N' = 3 \times 10^{-4}$ ($N = 300$) corresponds to $P/P_s = 0.580$; and $N' = 4 \times 10^{-4}$ ($N = 400$) corresponds to $P/P_s = 0.655$.

The output is clearly a single-valued monotonically increasing function of N but is, as noted, not linear in N. However, by contrast with the dual waveguide swept frequency refractometer, this single waveguide device is capable of continuous monitoring of the airflow being studied. The major limitation restricting the frequency capability of this device is the ventilation time of the open waveguide. The higher the frequency, the shorter the waveguide need be for an optimum cut-off behavior to be realized. However the cross-sectional area is also reduced, thereby exacerbating boundary layer effects. Fluid mechanical considerations will determine the optimum frequency for ideal ventilation.

It is possible to dispense with the requirement for a fixed, well defined, frequency source by employing multiple, identical parallel waveguides fabricated from low thermal expansivity materials. The manner in which this is accomplished is schematically shown in FIG. 7.

Figure 7:
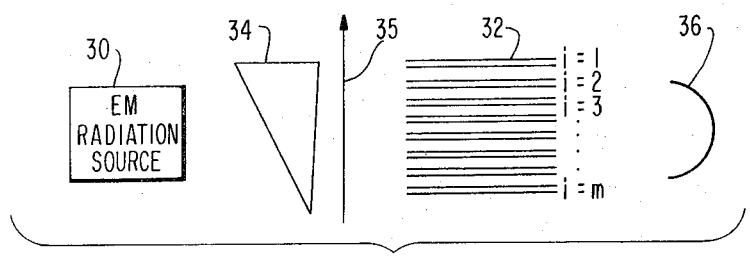
FIG. 7 is a schematic diagram of another embodiment of the invention.

In FIG. 7, a source 30 produces electomagnetic radiation having a bandwidth equal to or larger than the range of frequencies over which the waveguides 32 go through cut-off. There is absolutely no reason why the emission from this source has to be coherent. Any source, including pure noise sources, will be adequate providing their output per unit frequency is relatively uniform and is known over the frequency band of interest. In other words, even if there is a variation of output as a function of frequency, if this function is known and does not vary as a function of total output, the source will be adequate for use in this refractometer. For example, the infrared radiation from a tungsten filament could be employed as a source for this device.

A prism 34 spatially disperses the narrow frequency band of interest from the source, as indicated by the arrow 35 to show frequency variation as a function of position in the direction shown. Any dispersive device would be acceptable for this purpose, e.g., a grating rather than a prism would, in some circumstances, be more appropriate.

Figure 8:
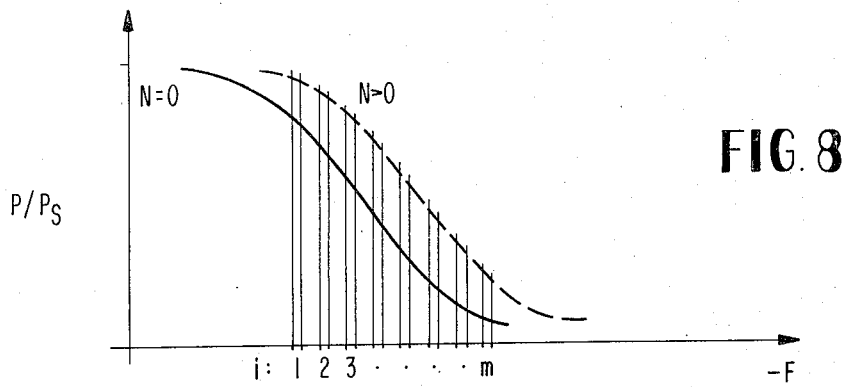
FIG. 8 is a graph illustrating the operation of the refractometer illustrated in FIG. 7.

This dispersed radiation irradiates the stack of $m$ identical waveguides 32. Each waveguide intercepts an equal, well-defined portion of the dispersed radiation from the source as depicted in FIG. 8. One straightforward way to accomplish this is to use planar waveguides formed of properly spaced gold-plated quartz plates.

A detector 36 measures the total radiation passing through the waveguides. A second detector to monitor the output of the source is not shown in FIG. 7 could be employed to normalize the signal from the detector and thereby eliminate output signal variation due to source power level shifts.

As depicted in FIG. 8, when the refractivity N increases from zero, the signal output produced by the detecor will also increase. The output of this detector (or the normalized output if the second detector is also employed) will therefore be a monotonic single-valued function of the refractivity. The total frequency dispersion employed (i.e., the frequency span from $i = 1$ to $i = m$) can obviously be tailored to maximize the sensitivity of the device to any range of refractivity desired.

This device is ideally suited for operation in the millimeter or IR wavelength ranges where it could be made quite compact, rugged and inexpensively.

By means of the foregoing description, I have disclosed a novel refractometer employing a waveguide operating near its cut-off frequency. In such a refractometer, the internal wave is repeatedly traversing a small volume of gas when the waveguide is operated near its cut-off frequency, and small variations in the refractivity of the gas will produce measurable changes which permit the small refractivity variations to be determined.

From an operational standpoint the new waveguide refractometer offers some interesting advantages with respect to cavity and capacitor type devices. Because the measurement of refractivity occurs inside of a completely open waveguide, there are fewer fluid mechanical problems associated with ventilation. Also since waveguides can be folded almost with impunity and can be conveniently positioned so as to have common walls, etc., thermal coupling between, for instance, a sampling and a reference waveguide can be made exceptionally intimate, thereby alleviating, if not eliminating, a major source of error. Because of design simplicity, such devices can be made exceptionally inexpensively, rugged and lightweight.

While the invention has been particularly shown and described with reference to preferred embodiments thereof, it will be understood by those skilled in the art that various changes in form and detail may be made therein without departing from the spirit and scope of the invention.

I claim:
1. A method of measuring the refractivity of a gas flowing through a waveguide comprising:
   a. propagating along the waveguide an electromagnetic wave having a known frequency in the vicinity of the cut-off frequency of the waveguide;
   b. measuring the propagated power level at a fixed point along the length of waveguide; and
   c. determining the refractivity as a function of the measured power level and the known frequency.
2. A method as defined in claim 1 wherein the frequency of the wave is within $\pm 0.1$ percent of the idealized cut-off frequency of the waveguide.
3. A method as defined in claim 2, further comprising linearly varying the wave frequency, and measuring the propagated power level at the frequency at which the slope of the power level-vs.-frequency curve is a maximum.
4. A method as defined in claim 1 wherein the frequency of the wave is within $\pm 2.0$ percent of the idealized cut-off frequency of the waveguide.
5. A method as defined in claim 1 wherein the refractivity of the gas is changing, and further comprising measuring the propagated power level at two different times at said given wave frequency, and determining the change in refractivity as a function of the difference in the two measured power levels.

6. A method of measuring the refractivity of a gas comprising:
   a. filling a reference waveguide with a reference gas of known refractivity;
   b. filling an identical sampling waveguide with a specimen gas of unknown refractivity;
   c. simultaneously propagating along both waveguides an electromagnetic wave having a known frequency $f$ in the vicinity of the cut-off frequency $f_{co}$ of the waveguides;
   d. linearly varying the frequency $f$ of the waves;
   e. measuring the power levels of the waves at the same distance along the lengths of the waveguides;
   f. detecting the frequencies $f_o$ and $f_N$ at which each of the measured power levels is equal to a predetermined power level; and
   g. determining the difference between the unknown and known refractivities as being equal to the difference between
   $$F_o = f_o - f_{co}/f_{co} \text{ and } F_N = f_N - f_{co}/f_{co}.$$
7. A method as defined in claim 6 wherein said known frequency $f$ is within $\pm 0.1$ percent of the idealized cut-off frequency of the waveguides.
8. A method as defined in claim 6 wherein the refractivity of the reference gas is zero, and determining the unknown refractivity as being equal to the difference between $F_o$ and $F_N$.
9. A method as defined in claim 8 further comprising continuously flowing the specimen gas through the sampling waveguide.
10. A method of measuring the refractivity of a gas comprising:
    a. filling a reference waveguide with a reference gas of known refractivity;
    b. filling an identical sampling waveguide with a specimen gas of unknown refractivity;
    c. simultaneously propagating along both waveguides an electromagnetic wave having a known frequency $f$ in the vicinity of the cut-off frequency $f_{co}$ of the waveguides;
    d. linearly varying the frequency $f$ of the waves;
    e. measuring the power levels of the waves at the same distance along the lengths of the waveguides;
    f. detecting the times at which each of the measured power levels is equal to a predetermined power level; and
    g. determining the difference between the unknown and known refractivities as being proportional to the difference in the detection times.
11. A method as defined in claim 10 wherein the refractivity of the reference gas is zero, and determining the unknown refractivity as being proportional to the difference between the detection times.
12. A method of measuring the refractivity of an unknown gas comprising:
    a. calculating and plotting a reference curve of the normalized propagated power level $P_o$ at a point along the length of a waveguide-vs.-$F_o$, where $F_o = f - f_{co}/f_{co}$, and $f$ is the known frequency of an electromagnetic wave propagating along the waveguide, for the condition wherein the frequency $f$ is within $\pm 0.1$ percent of the known cut-off frequency $f_{co}$ of the waveguide when the waveguide contains a vacuum having a refractivity of zero;

said reference curve including a point defined by co-ordinates $(P, F_o)$;

b. flowing the unknown gas through the waveguide;

c. propagating through the unknown gas in the waveguide an electromagnetic wave having said frequency $f$;

d. measuring the normalized power level $P_{N'}$ of the wave at said point; and e. determining the unknown refractivity by using the relationship that as the refractivity of the unknown gas increases, the reference curves shift to lower values of $F$ by an amount $F = -N'$, where $N$ is the unknown refractivity and $N' = N \times 10^{-6}$.

13. A refractometer for measuring the refractivity of a gas comprising:

a. a reference waveguide filled with a reference gas of known refractivity;

b. an identical sampling waveguide filled with a specimen gas of unknown refractivity;

c. means for simultaneously propagating along both waveguides an electromagnetic wave having a known frequency $f$ in the vicinity of the cut-off frequency $f_{co}$ of the waveguides;

d. means for linearly varying the frequency $f$ of the waves;

e. means for measuring the power levels of the waves at the same distance along the lengths of the waveguides;

f. means for detecting the times at which each of the measured power levels is equal to a predetermined power level, whereby the difference between the unknown and known refractivities is proportional to the difference in the detection times.

14. A refractometer as defined in claim 13 wherein the refractivity of the reference gas is zero, so that the unknown refractivity is proportional to the difference between the detection times.

15. The method found in claim 6 further comprising positioning the reference and sampling waveguides such that they are strongly thermally coupled.

* * * * *